(12) United States Patent
Katsube et al.

(10) Patent No.: US 8,301,208 B2
(45) Date of Patent: Oct. 30, 2012

(54) RECEIVER AND RECEIVING METHOD OF THE RECEIVER

(75) Inventors: Yusaku Katsube, Yokohama (JP); Masaaki Yamada, Yokohama (JP); Junichi Takahashi, Yokohama (JP)

(73) Assignee: Renesas Electronics Corporation, Kanagawa (JP)

( * ) Notice: Subject to any disclaimer, the term of this patent is extended or adjusted under 35 U.S.C. 154(b) by 348 days.

(21) Appl. No.: 12/472,741

(22) Filed: May 27, 2009

(65) Prior Publication Data

US 2009/0310524 A1 Dec. 17, 2009

(30) Foreign Application Priority Data

Jun. 12, 2008 (JP) .................... 2008-153651

(51) Int. Cl.
*H04M 1/00* (2006.01)
*H04B 1/38* (2006.01)
(52) U.S. Cl. ...................... 455/574; 455/343.2; 455/227; 455/229
(58) Field of Classification Search ............... 455/232.1, 455/254, 237.1, 245.1, 343.1–343.6
See application file for complete search history.

(56) References Cited

U.S. PATENT DOCUMENTS

2007/0091934 A1* 4/2007 Myles et al. ................. 370/503
2008/0227421 A1* 9/2008 Balakrishnan ............. 455/233.1

FOREIGN PATENT DOCUMENTS

JP 2006-20254 A 1/2006

OTHER PUBLICATIONS

T. Meng et al., Design and Implementation of an All-CMOS 802.11a Wireless LAN Chipset, IEEE Communications Magazine, Aug. 2003, pp. 160-168.
P. Zhang et al., A Single-Chip Dual-Band Direct-Conversion IEEE 802.11a/b/g WLAN Transceiver in 0.18-μm CMOS, IEEE Journal of Solid-State Circuits, vol. 40, No. 9, Sep. 2005, pp. 1932-1939.

* cited by examiner

*Primary Examiner* — Christian Hannon
(74) *Attorney, Agent, or Firm* — Mattingly & Malur, PC

(57) ABSTRACT

The receiver includes a low noise amplifier, a local signal generator, a first mixer, a second mixer, a first amplifier, a second amplifier, a first A/D converter, a second A/D converter, and a signal level detection unit. A detection signal from at least one terminal of the first A/D converter is supplied to an input terminal of the signal level detection unit, thereby generating a reception start signal from the output terminal. Before an RF reception signal is received, a first signal processing unit containing the first mixer, the first amplifier, and the first A/D converter is controlled to an active state, and a second signal processing unit containing the second mixer, the second amplifier, and the second A/D converter is controlled to a low power consumption state. After the RF reception signal is received, the second signal processing unit is controlled to the active state.

14 Claims, 5 Drawing Sheets

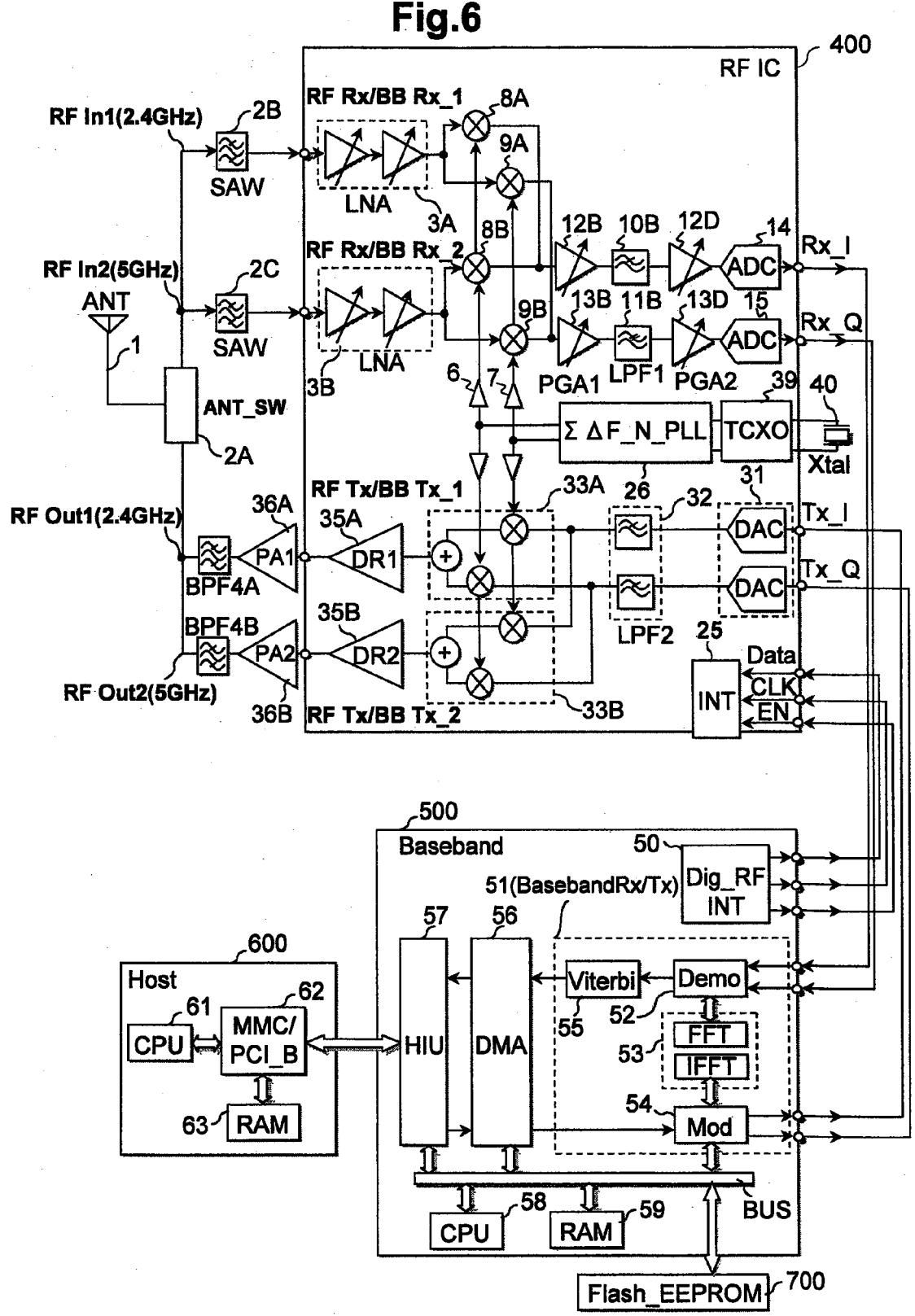

RECEIVER AND RECEIVING METHOD OF THE RECEIVER

CLAIM OF PRIORITY

The present application claims priority from Japanese patent application JP 2008-153651 filed on Jun. 12, 2008, the content of which is hereby incorporated by reference into this application.

FIELD OF THE INVENTION

The present invention relates to a receiver and a receiving method thereof, and in particular, relates to a technique useful for achieving lower power consumption during reception standby.

BACKGROUND OF THE INVENTION

In response to demands for wideband wireless communication, IEEE802.11a as a new wireless LAN standard based on orthogonal frequency division multiplex (OFDM) provides about five times the data rate and at least 20 times the overall system capacity compared to the current IEEE802.11b wireless LAN system. OFDM stands for Orthogonal Frequency Division Multiplex, and LAN stands for Local Area Network.

The following non-patent document 1 describes that the IEEE802.11a wireless LAN system contains a physical layer (PHY) and a media access layer (MAC), and the physical layer is based on the orthogonal frequency division multiplex (OFDM). A modulation technique using multiple carriers reduces a multipath effect, and the OFDM distributes data into multiple carriers separated at accurate frequencies.

The non-patent document 1 describes that the 802.11a wireless LAN system contains a CMOS RF transceiver chip and a digital baseband chip. Dual conversion is adopted in the architecture of the receiver and transmitter of the RF transceiver without direct conversion being adopted therein. Reception baseband signals I and Q down-converted by the receiver are amplified by programmable gain amplifiers (PGA) through off-chip passive LC channel selection filters. The DC offsets of the outputs of the two programmable gain amplifiers are cancelled by two 6-bit D/A converters. DC offset cancellation, automatic gain control (AGC), frequency offset cancellation, timing offset cancellation, and received signal strength indicator (RSSI) are implemented by a digital algorithm of the baseband chip.

In the digital baseband chip, the reception baseband signals I and Q from the receiver of the RF transceiver are supplied to A/D converters, and the output digital signals of the A/D converters are supplied to autocorrelators through two FIR filters. The outputs of the A/D converters and the outputs of the autocorrelators are supplied to a signal detection AGC unit, and the DC offset and gain of the analog receiver are calibrated by the output of this unit. Automatic gain control (AGC) controls the gain of the receiver so as to maximize the reception signal without saturating inputs to the A/D converters to cope with adjacent channel interference, the peak value of reception OFDM symbols, and amplitude variation due to fading. A relatively short period of about 4 microseconds for automatic gain control (AGC) in 802.11a requires a fast loop from digital power measurement to analog gain adjustment. Signal detection, frequency offset estimation, and symbol timing depend entirely on autocorrelation of a period training symbol supplied to a preamble. Ten short preamble symbols each having a period of 0.8 microseconds are used to detect the presence of a frame (burst), calculate a carrier frequency supplied to a frequency rotator, and estimate symbol timing. Long preamble symbols which are two long training OFDM symbols each having a period of 4 microseconds are subjected to averaging, fast Fourier transform (FFT), and filtering. The output digital signals of the A/D converters are supplied to one FIR filter, DC offset elimination unit, frequency rotator, fast Fourier transformer (FFT), channel selection filter, and Viterbi decoder. Reception data to the media access layer (MAC) is generated from the output terminal of the Viterbi decoder. The fast Fourier transformer (FFT) shares hardware with an inverse fast Fourier transformer (IFFT) for the transmitter.

The following non-patent document 2 describes a wireless LAN transceiver that covers a first frequency band of 2.412 to 2.484 GHz complying with the IEEE802.11b/g standard and a second frequency band of 4.92 to 5.805 GHz complying with the IEEE802.11a standard. Due to low cost, low power consumption, design complexity, suitability for high integration density, and high-volume production capability, this transceiver adopts CMOS-process single-chip dual-band direct-conversion architecture.

On the other hand, the following patent document 1 describes a wireless LAN apparatus that includes a detection circuit for detecting the reception signal strength of a radio-frequency signal, a power supply control circuit for controlling the power supply of an intermediate-frequency signal processing unit of an analog part in response to the detection result of the signal strength, and an operation clock control circuit for controlling the supply of an operation clock to a digital demodulation unit, thereby reducing the power consumption during reception standby.

[Non-patent document 1] Teresa H. Meng et al, "Design and Implementation of an All-CMOS 802.11a Wireless LAN Chipset", IEEE COMMUNICATION MAGAZINE, AUGUST 2003, PP. 160-168.

[Non-patent document 2] Pengfei Zhang et al, "A Single-Chip Dual-Band Direct-Conversion IEEE 802.11a/b/g WLAN Transceiver in 0.18-μm CMOS", IEEE JOURNAL OF SOLID-STATE CIRCUITS, VOL. 40, NO. 9, SEPTEMBER 2005, PP. 1932-1939.

[Patent document 1] Japanese patent application laid-open No. 2006-020254.

SUMMARY OF THE INVENTION

At present, various battery-operated mobile devices such as notebook PCs are equipped with a wireless LAN. Accordingly, for long-time operation of such a battery-operated mobile device, it becomes necessary to reduce the power consumption of the mobile device.

Further, for example, wireless LAN IEEE802.11a is a standard specific to data packet communication. Accordingly, to receive a packet whose arrival time cannot be predicted, the receiver is typically set to a reception standby state. Usually, a standby state in which no packet has arrived is longer than a transmission/reception state in the wireless LAN; therefore, it is important to reduce the power consumption of the receiver during standby.

According to the wireless LAN apparatus described in the patent document 1, by including the receive signal strength detection circuit, the power supply control circuit, and the operation clock control circuit, it is possible to reduce the power consumption of the intermediate-frequency signal processing unit and the digital demodulation unit during reception standby. However, to make the operation time longer, it is necessary to further reduce the power consumption.

Accordingly, it is an object of the present invention to enable lower power consumption of a receiver during reception standby.

The above and other objects and novel features of the present invention will be apparent from the description of this specification and the accompanying drawings.

A receiver according to one aspect of the invention includes a first signal processing unit which generates a first conversion signal by detecting an in-phase or quadrature signal from a quadrature modulation signal inputted to the first signal processing unit, a second signal processing unit which generates a second conversion signal by detecting a signal having a phase difference of about 90 degrees with respect to the first conversion signal from the quadrature modulation signal inputted to the second signal processing unit, and a signal level detection unit which generates a reception start signal by receiving the first conversion signal, wherein before the quadrature modulation signal is inputted, the first signal processing unit is controlled to an active state, and the second signal processing unit is controlled to a low power consumption state, and after the quadrature modulation signal is inputted, the second signal processing unit is controlled to the active state from the low power consumption state in response to the reception start signal generated by the signal level detection unit (see FIG. 1).

A receiver according to another aspect includes a first A/D converter which A/D-converts a first analog signal inputted from a first signal processing unit which generates a first conversion signal by detecting an in-phase or quadrature signal from a quadrature modulation signal inputted to the first signal processing unit, a second A/D converter which A/D-converts a second analog signal inputted from a second signal processing unit which generates a second conversion signal by detecting a signal having a phase difference of about 90 degrees with respect to the first conversion signal from the quadrature modulation signal inputted to the second signal processing unit, and a signal level detection unit which generates a reception start signal by receiving the first conversion signal, wherein before the first analog signal is inputted, the first A/D converter is controlled to an active state, and the second A/D converter is controlled to a low power consumption state, and after the first analog signal is inputted, the second A/D converter is controlled to the active state from the low power consumption state in response to the reception start signal generated by the signal level detection unit (see FIG. 1).

According to the invention, it is possible to enable lower power consumption of the receiver during reception standby.

BRIEF DESCRIPTION OF THE DRAWINGS

FIG. 6 is a diagram showing the configuration of a wireless LAN system according to a specific embodiment of the invention.

DETAILED DESCRIPTION OF THE PREFERRED EMBODIMENTS

Typical Embodiments

Figure 1:
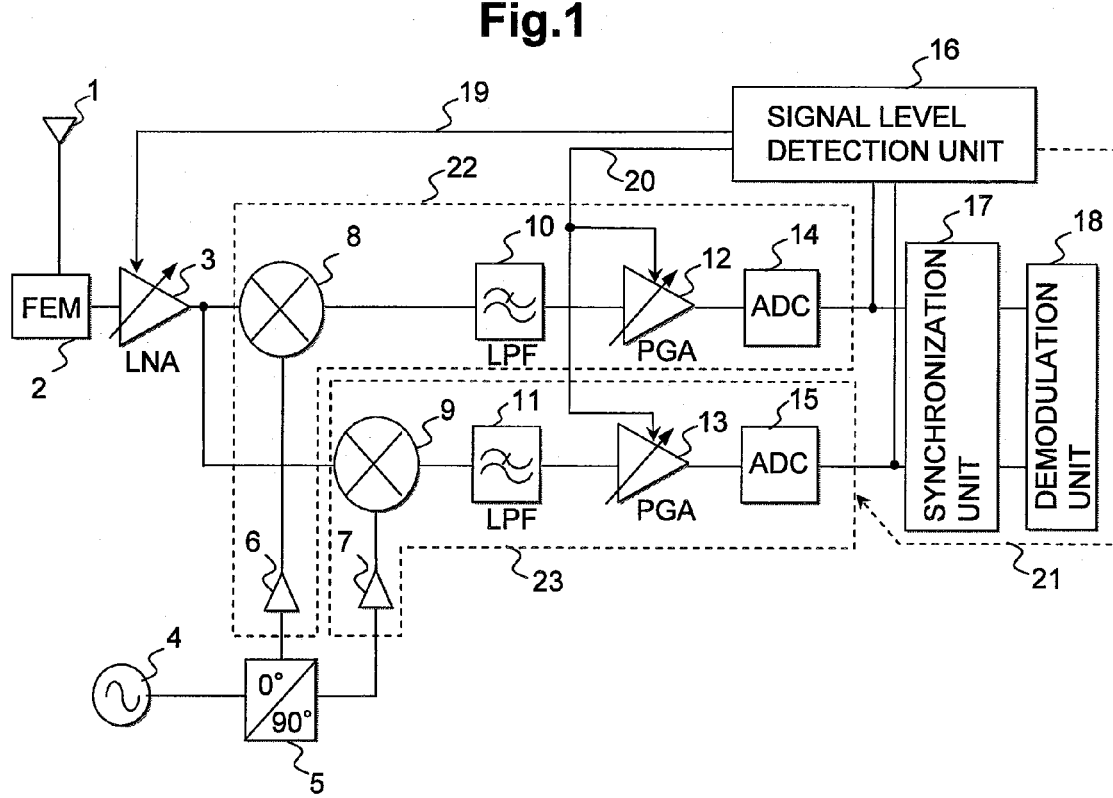
FIG. 1 is a diagram showing the configuration of a wireless LAN receiver according to a first embodiment of the present invention, for illustrating the principle of the invention.

Summaries of typical embodiments of the invention disclosed in the present application will first be explained. Reference numerals in the drawings that are referred to with parentheses applied thereto in the description of the summaries of the typical embodiments are merely illustrations of ones contained in the concepts of the components marked with the reference numerals.

[1] A receiver according to a typical embodiment of the invention includes a low noise amplifier (3), a local signal generator (5), a first mixer (8), a second mixer (9), a first programmable gain amplifier (12), a second programmable gain amplifier (13), a first A/D converter (14), a second A/D converter (15), and a signal level detection unit (16).

The low noise amplifier (3) amplifies an RF reception signal received by an antenna (1), thereby generating an RF amplification signal.

The local signal generator (5) generates a first local signal and a second local signal which have a phase difference of about 90 degrees therebetween.

The first mixer (8) generates a first conversion signal based on the RF amplification signal from the low noise amplifier and the first local signal from the local signal generator.

The second mixer (9) generates a second conversion signal having a phase difference of about 90 degrees with respect to the first conversion signal, based on the RF amplification signal from the low noise amplifier and the second local signal from the local signal generator.

The first conversion signal from the first mixer is supplied to the input terminal of the first A/D converter (14) through the first programmable gain amplifier (12).

The second conversion signal from the second mixer is supplied to the input terminal of the second A/D converter (15) through the second programmable gain amplifier (13).

A first digital conversion signal is generated from the output terminal of the first A/D converter, and a second digital conversion signal is generated from the output terminal of the second A/D converter.

A detection signal from at least one of the input terminal and the output terminal of the first A/D converter (14) is supplied to an input terminal of the signal level detection unit (16), thereby generating a reception start signal (21) from the output terminal of the signal level detection unit.

Before the antenna receives the RF reception signal, a first signal processing unit (22) containing the first mixer, the first programmable gain amplifier, and the first A/D converter is controlled to an active state, and a second signal processing unit (23) containing the second mixer, the second programmable gain amplifier, and the second A/D converter is controlled to a low power consumption state.

After the antenna receives the RF reception signal, the second signal processing unit (23) is controlled to the active state from the low power consumption state in response to the reception start signal (21) generated by the signal level detection unit (16) (see FIG. 1).

According to this embodiment, the second signal processing unit (23) is controlled to an inactive state of low power consumption in a reception standby state, thus enabling lower power consumption of the receiver during reception standby.

Figure 2:
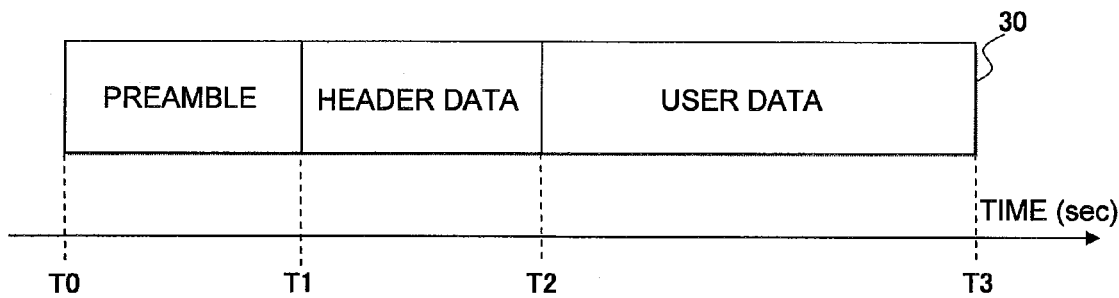
FIG. 2 is a diagram showing the structure of an OFDM packet according to the wireless LAN 802.11a standard which is supplied to the wireless LAN receiver shown in FIG. 1.

In a preferred embodiment, the RF reception signal amplified by the low noise amplifier (3) is packet data (30) containing payload data and a preamble and a header preceding the payload data (see FIG. 2).

The signal level detection unit (16) detects the signal of the preamble as the detection signal, thereby generating the reception start signal (21).

In a more preferred embodiment, the first conversion signal generated by the first mixer (8) and the second conversion signal generated by the second mixer (9) are baseband signals, and the first mixer and the second mixer configure a direct down-conversion mixer.

In a further more preferred embodiment, the packet data (30) is transfer data by a wireless LAN (see FIG. 2).

In a specific embodiment, the wireless LAN is based on the IEEE802.11a standard and any one of the IEEE802.11b, IEEE802.11g, and IEEE802.11n standards.

In another specific embodiment, only the signal from the output terminal of the first A/D converter (14) is supplied as the detection signal to the signal level detection unit (16).

In yet another specific embodiment, the signal level detection unit (16) measures the signal level of the output terminal of the first A/D converter (14), and controls the gain of the low noise amplifier (3), the first programmable gain amplifier (12), and the second programmable gain amplifier (13), based on the measurement result.

In yet still another specific embodiment, the reception start signal (21) is a logic signal, and the active state and the low power consumption state of the second signal processing unit (23) are controlled by the level of the logic signal of the reception start signal (21).

In the most specific embodiment, the first signal processing unit (22) is brought to the active state by supplying a power supply voltage to the first signal processing unit, and the second signal processing unit (23) is brought to the low power consumption state by cutting off the supply of a power supply voltage to the second signal processing unit. Further, the second signal processing unit (23) is controlled to the active state from the low power consumption state by supplying the power supply voltage to the second signal processing unit in response to the reception start signal (21).

[2] A receiver according to another typical embodiment of the invention includes a low noise amplifier (3), a local signal generator (5), a first mixer (8), a second mixer (9), a first programmable gain amplifier (12), a second programmable gain amplifier (13), a first A/D converter (14), a second A/D converter (15), signal processing units (17, 18), and a signal level detection unit (16).

The receiver operates as follows.

The low noise amplifier (3) amplifies an RF reception signal received by an antenna (1), thereby generating an RF amplification signal.

The local signal generator (5) generates a first local signal and a second local signal which have a phase difference of about 90 degrees therebetween.

The first mixer (8) generates a first conversion signal based on the RF amplification signal from the low noise amplifier and the first local signal from the local signal generator.

The second mixer (9) generates a second conversion signal having a phase difference of about 90 degrees with respect to the first conversion signal, based on the RF amplification signal from the low noise amplifier and the second local signal from the local signal generator.

The first conversion signal from the first mixer is supplied to the input terminal of the first A/D converter (14) through the first programmable gain amplifier (12).

The second conversion signal from the second mixer is supplied to the input terminal of the second A/D converter (15) through the second programmable gain amplifier (13).

A first digital conversion signal from the output terminal of the first A/D converter and a second digital conversion signal from the output terminal of the second A/D converter are supplied to the signal processing units (17, 18).

A detection signal from at least one of the input terminal and the output terminal of the first A/D converter (14) is supplied to the input terminal of the signal level detection unit (16), thereby generating a reception start signal (21) from the output terminal of the signal level detection unit.

Before the antenna receives the RF reception signal, a first signal processing unit (22) containing the first mixer, the first programmable gain amplifier, and the first A/D converter is controlled to an active state, and a second signal processing unit (23) containing the second mixer, the second programmable gain amplifier, and the second A/D converter is controlled to a low power consumption state.

After the antenna receives the RF reception signal, the second signal processing unit (23) is controlled to the active state from the low power consumption state in response to the reception start signal (21) generated by the signal level detection unit (16) (see FIG. 1).

According to this embodiment, the second signal processing unit (23) is controlled to an inactive state of low power consumption in a reception standby state, thus enabling lower power consumption of the receiver.

DESCRIPTION OF EMBODIMENTS

Next, preferred embodiments will be described in more detail. In all the drawings for illustrating the preferred embodiments, components having the same functions as in FIG. 1 are denoted by the same reference numerals, and their description will not be repeated.

<<Configuration of Wireless LAN Receiver>>

Hereinafter, a first embodiment of the invention will be described with reference to FIGS. 1 and 2.

FIG. 1 is a diagram showing the configuration of a wireless LAN receiver according to the first embodiment of the invention, for illustrating the principle of the invention.

The wireless LAN receiver shown in FIG. 1 includes an antenna 1, a front end module (FEM) 2, a low noise amplifier (LNA) 3, a local oscillator 4, a 90-degree phase shifter 5, an in-phase (I) signal processing unit 22, a quadrature-phase (Q) signal processing unit 23, a signal level detection unit 16, a synchronization unit 17, and a demodulation unit 18. In the wireless LAN receiver of FIG. 1, in response to a local oscillation signal generated by the local oscillator 4, the 90-degree phase shifter 5 supplies an I local signal and a Q local signal which have a phase difference of 90 degrees therebetween to an I signal mixer 8 of the I signal processing unit 22 and a Q signal mixer 9 of the Q signal processing unit 23, respectively. An RF signal frequency according to wireless LAN 802.11a which is received by the antenna 1 and supplied through the front end module 2 and the low noise amplifier 3 to one input terminal of the I signal mixer 8 and one input terminal of the Q signal mixer 9 is set to an RF frequency of about 5 GHz. The frequencies of the I local signal and the Q local signal which are supplied from the 90-degree phase shifter 5 to the other input terminal of the I signal mixer 8 and the other input terminal of the Q signal mixer 9 respectively are also set to an RF frequency of about 5 GHz which is identical to the RF signal frequency according to wireless LAN 802.11a. Accordingly, the I signal mixer 8 of the I signal processing unit 22 and the Q signal mixer 9 of the Q signal processing unit 23 perform quadrature direct down-conversion for generating an I baseband signal and a Q baseband signal which have a phase difference of 90 degrees therebetween.

The I signal processing unit 22 contains an I signal local buffer 6, the I signal mixer 8, an I signal low-pass filter 10, an I signal programmable gain amplifier (PGA) 12, and an I signal A/D converter 14. Similarly to the I signal processing unit 22, the Q signal processing unit 23 contains a Q signal local buffer 7, the Q signal mixer 9, a Q signal low-pass filter 11, a Q signal programmable gain amplifier (PGA) 13, and a Q signal A/D converter 15.

FIG. 2 is a diagram showing the structure of an OFDM packet according to the wireless LAN 802.11a standard which is supplied to the wireless LAN receiver shown in FIG. 1. As shown in FIG. 2, an OFDM packet 30 contains a preamble and a header preceding user data (payload data).

In the case where the wireless LAN receiver shown in FIG. 1 receives the OFDM packet 30 shown in FIG. 2, an RF reception signal according to wireless LAN 802.11a inputted from the antenna 1 at time T0, an unwanted band thereof being eliminated by a filter in the front end module 2, is inputted to the low noise amplifier 3. An RF amplification output signal of the low noise amplifier 3 is supplied to one input terminal of the I signal mixer 8 and one input terminal of the Q signal mixer 9.

An output of the local oscillator 4 is inputted to the 90-degree phase shifter 5, and the 90-degree phase shifter 5 generates an I local signal which is an in-phase component and a Q local signal which is a quadrature component. The I local signal outputted from the 90-degree phase shifter 5 is inputted to the other input terminal of the I signal mixer 8 through the I signal local buffer 6. The I signal mixer 8 mixes the RF amplification output signal inputted to one input terminal from the low noise amplifier 3 and the I local signal inputted to the other input terminal through the I signal local buffer 6, thereby outputting an I baseband signal.

A frequency component other than the desired frequency band of the I baseband signal is suppressed by the I signal low-pass filter 10, whereas the desired frequency component of the I baseband signal is amplified by the I signal programmable gain amplifier 12, and the amplified signal is inputted to the I signal A/D converter 14. An I baseband digital signal obtained by A/D conversion is outputted from the I signal A/D converter 14, and inputted to the signal level detection unit 16 and the synchronization unit 17.

The signal level detection unit 16 calculates the root-mean-square value of the I baseband digital signal as the output of the I signal A/D converter 14 and the Q baseband digital signal as the output of the Q signal A/D converter 15, thereby obtaining a reception input signal level. If the input signal level is higher than a predetermined threshold value, the signal level detection unit 16 determines that an RF reception signal packet according to wireless LAN 802.11a has been received. In response to the determination result, the signal level detection unit 16 supplies the high level of a reception start signal 21 to the Q signal processing unit 23. In response to the change of the reception start signal 21 from a low level to the high level, the supply of a power supply voltage to the Q signal local buffer 7, the Q signal mixer 9, the Q signal low-pass filter 11, the Q signal programmable gain amplifier 13, and the Q signal A/D converter 15 in the Q signal processing unit 23 is started to start the operations of the circuits.

Accordingly, the Q local signal outputted from the 90-degree phase shifter 5 is inputted to the other input terminal of the Q signal mixer 9 through the Q signal local buffer 7. The Q signal mixer 9 mixes the Q local signal inputted to the other input terminal through the Q signal local buffer 7 and the RF amplification output signal inputted to one input terminal from the low noise amplifier 3, thereby outputting the Q baseband signal.

A frequency component other than the desired frequency band of the Q baseband signal is suppressed by the Q signal low-pass filter 11, whereas the desired frequency component of the Q baseband signal is amplified by the Q signal programmable gain amplifier 13, and the amplified signal is inputted to the Q signal A/D converter 15. A Q baseband digital signal obtained by A/D conversion is outputted from the Q signal A/D converter 15, and inputted to the signal level detection unit 16 and the synchronization unit 17.

The signal level detection unit 16 performs automatic gain control (AGC) so that the I baseband signal and the Q baseband signal are supplied at an optimum input level to the I signal A/D converter 14 and the Q signal A/D converter 15, respectively. That is, in response to a symbol contained in the preamble from time T0 to time T1 in FIG. 2, the signal level detection unit 16 adjusts the gain of the low noise amplifier 3 by means of an LNA gain adjustment signal 19, and adjusts the gain of the I signal programmable gain amplifier 12 and the gain of the Q signal programmable gain amplifier 13 by means of a PGA gain adjustment signal 20. After the completion of the automatic gain control (AGC) by the signal level detection unit 16, the synchronization unit 17 performs carrier frequency synchronization, symbol timing synchronization, and the like in response to another symbol contained in the preamble from time T0 to time T1 in FIG. 2. Then, the demodulation unit 18 extracts, by demodulation, necessary information from the header data from time T1 in FIG. 2 and the user data from time T2.

When the OFDM packet 30 ends at time T3 in FIG. 2, the reception start signal 21 from the signal level detection unit 16 changes from the high level to the low level. In response to this change, the supply of the power supply voltage to the Q signal local buffer 7, the Q signal mixer 9, the Q signal low-pass filter 11, the Q signal programmable gain amplifier 13, and the Q signal A/D converter 15 configuring the Q signal processing unit 23 is stopped to stop the operations of the circuits.

With the above configuration, the supply of the power supply voltage to the Q signal local buffer 7, the Q signal mixer 9, the Q signal low-pass filter 11, the Q signal programmable gain amplifier 13, and the Q signal A/D converter 15 configuring the Q signal processing unit 23 is stopped during reception standby, which can reduce the power consumption during reception standby.

In the wireless LAN system of FIG. 1, it is possible to integrate, in a single chip, the low noise amplifier 3, the local oscillator 4, the 90-degree phase shifter 5, the local buffers 6 and 7, the mixers 8 and 9, the low-pass filters 10 and 11, the programmable gain amplifiers 12 and 13, the A/D converters 14 and 15, the signal level detection unit 16, the synchronization unit 17, and the demodulation unit 18. Further, it is also possible to dispose, in a separate chip, the A/D converters 14 and 15, the signal level detection unit 16, the synchronization unit 17, and the demodulation unit 18.

<<Reception Start to Reception End of OFDM Packet>>

Figure 3:
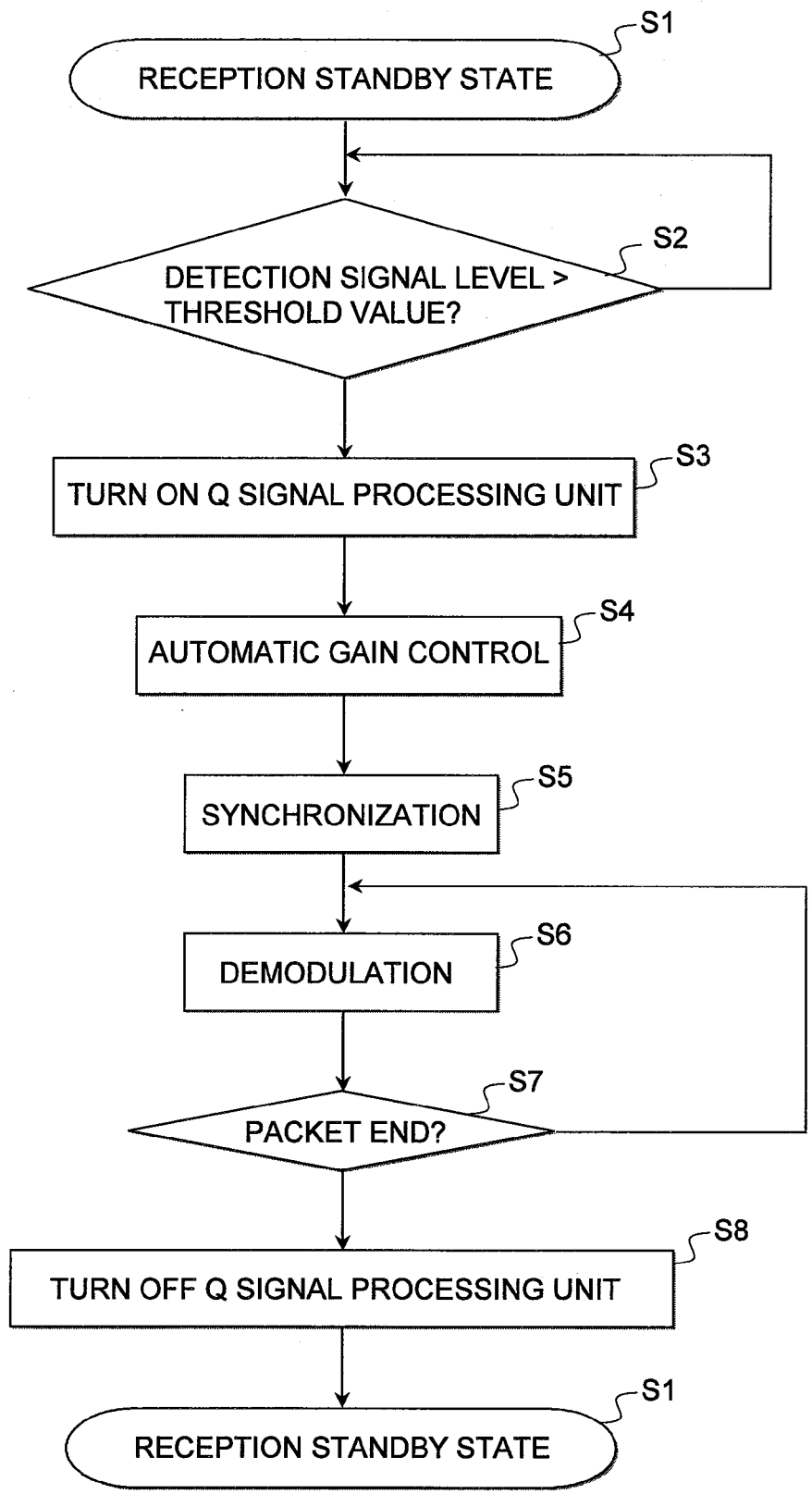
FIG. 3 is a flowchart illustrating an operation from reception start to reception end of the OFDM packet shown in FIG. 2 performed by the wireless LAN receiver shown in FIG. 1.

FIG. 3 is a flowchart illustrating an operation from reception start to reception end of the OFDM packet 30 shown in FIG. 2 performed by the wireless LAN receiver shown in FIG. 1.

In a reception standby state (step S1), the signal level detection unit 16 responds to a symbol contained in the preamble from time T0 to time T1 in FIG. 2. That is, the signal level detection unit 16 detects that the detection signal level of the symbol contained in the preamble is higher than the predetermined threshold value. In this case, the signal level detection unit 16 determines that an RF reception signal packet according to wireless LAN 802.11a has been received (step S2). In response to this determination result, the signal level detection unit 16 turns on the reception start signal 21 to start the supply of the power supply voltage to the circuits in the Q signal processing unit 23 (step S3). However, if the detection signal level detected by the signal level detection unit 16 is lower than the predetermined threshold value, the supply of the power supply voltage to the circuits in the Q signal processing unit 23 is not started so that the Q signal processing unit 23 maintains the reception standby state. After the supply of the power supply voltage to the circuits in the Q signal processing unit 23 in step S3 is started, the signal level detection unit 16 performs automatic gain control (AGC) for the gain adjustment of the low noise amplifier 3 and the gain adjustment of the I signal programmable gain amplifier 12 and the Q signal programmable gain amplifier 13 (step S4). After the completion of the automatic gain control in step S4, the synchronization unit 17 performs subcarrier frequency synchronization and symbol timing synchronization (step S5). Then, the demodulation unit 18 demodulates the reception signal by performing a fast Fourier transform (FFT) on the OFDM symbol through baseband processing (step S6). Then, in step S7, if the detection signal level detected by the signal level detection unit 16 is lower than the predetermined threshold value, the signal level detection unit 16 determines that the reception of the RF reception signal packet according to wireless LAN 802.11a has been completed. In response to this determination result, the signal level detection unit 16 turns off the reception start signal 21 to stop the supply of the power supply voltage to the circuits in the Q signal processing unit 23 (step S8). Accordingly, the Q signal processing unit 23 returns to the reception standby state of low power consumption (step S1).

<<Detailed Structure of OFDM Packet>>

Figure 4:
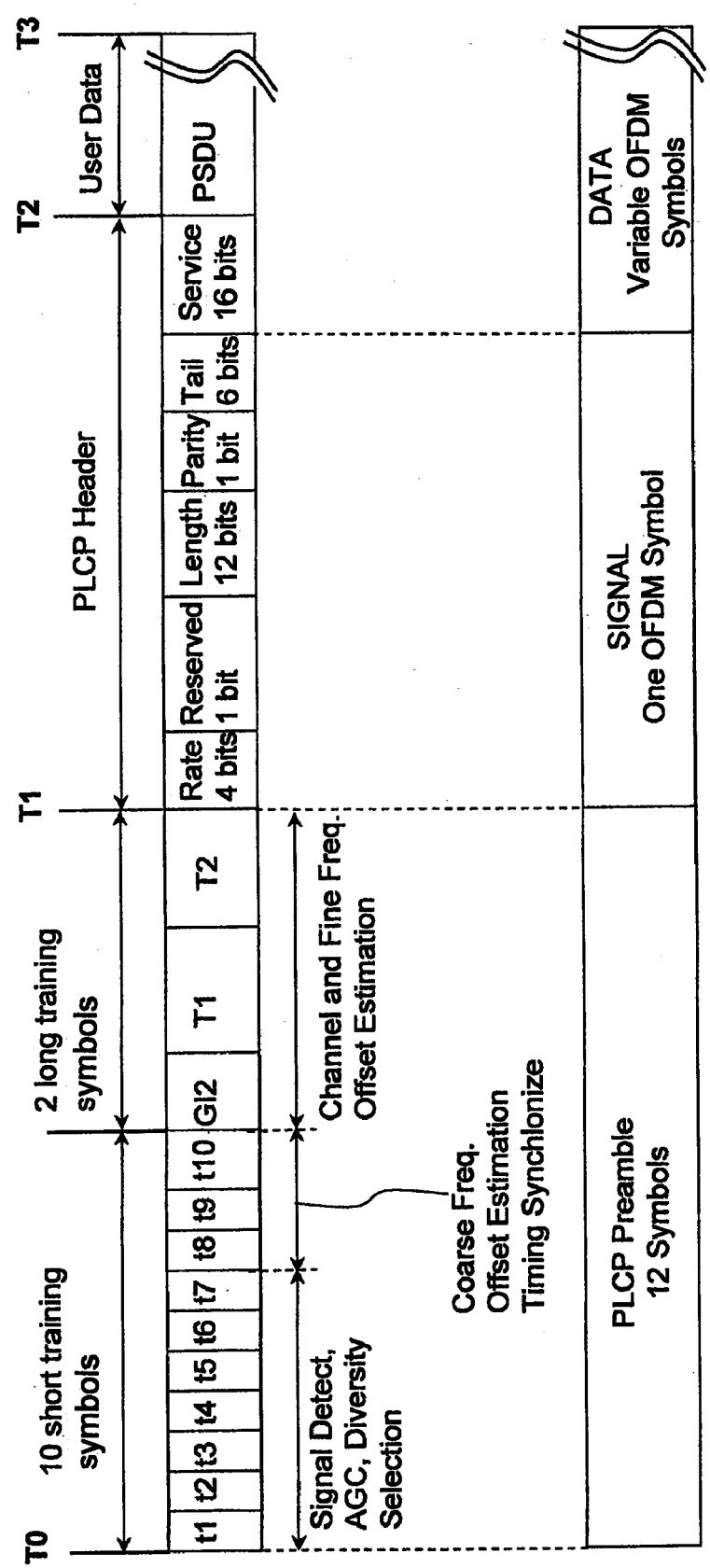
FIG. 4 is a detailed diagram showing the structure of the OFDM packet according to the wireless LAN 802.11a standard which is supplied to the wireless LAN receiver shown in FIG. 1.

FIG. 4 is a detailed diagram showing the structure of the OFDM packet according to the wireless LAN 802.11a standard which is supplied to the wireless LAN receiver shown in FIG. 1.

As shown in FIG. 4, according to the OFDM physical layer convergence procedure (PLCP) of the 802.11a wireless LAN system, a PLCP preamble from time T0 to time T1 contains 12 symbols including ten short symbols and two long symbols. In the PLCP preamble, the first to seventh short symbols are used for signal detection, automatic gain control (AGC), and diversity selection, and the eighth to tenth short symbols are used for coarse frequency offset estimation and timing synchronization. Further, the two long symbols are used for fine-tuning of frequency and channel estimation. PLCP stands for Physical Layer Convergence Procedure.

A PLCP header from time T1 to time T2 in FIG. 4 contains rate, reservation, length, parity, tail, and service, which are information of one OFDM symbol. The 4-bit rate indicates a data transfer rate between 6 and 54 Mbits/sec. The 12-bit PLCP length indicates the data length of PSDU data which a media access layer (MAC) is currently requesting a physical layer (PHY) to transfer. The tail containing six "0" levels is necessary to return an encoder of a transmitter to a zero state. The first seven bits of the 16-bit service field are all "0" levels, and are used to synchronize a descrambler of a receiver. The last nine bits of the service field are reserved for future use.

User data from time T2 to time T3 in FIG. 4 contains PSDU data including information of variable OFDM symbols. PSDU stands for PHY (Physical Layer) Sublayer Service Data Units.

Each of the ten short symbols in the PLCP preamble from time T0 to time T1 in FIG. 4 has a symbol period of 0.8 microseconds. Accordingly, in the wireless LAN receiver shown in FIG. 1, the time from when the signal level detection unit 16 detects the start of reception of the RF reception signal packet according to wireless LAN 802.11a in step S2 to when the supply of the power supply voltage to the Q signal processing unit 23 is started in step S3 and the signal is inputted to the Q signal A/D converter 15 is set to a symbol period of about 0.8 microseconds or less. Accordingly, in the wireless LAN receiver shown in FIG. 1, the detection of the reception start in step S2 and the start of the supply of the power supply voltage to the Q signal processing unit 23 in step S3 can be completed between the first short symbol t1 and the second short symbol t2 in the PLCP preamble from time T0 to time T1 in FIG. 4. Consequently, in the wireless LAN receiver shown in FIG. 1, it is possible to start automatic gain control (AGC) in step S4 from the time of the second short symbol t2 in the PLCP preamble from time T0 to time T1 in FIG. 4. After the completion of the automatic gain control in step S4, the synchronization unit 17 performs subcarrier frequency synchronization and symbol timing synchronization in step S5 by using the eighth short symbol t8 to the tenth short symbol t10 and the two long symbols T1 and T2 in the PLCP preamble of FIG. 4. Then, the demodulation unit 18 demodulates the reception signal in step S6 by performing a fast Fourier transform (FFT) on the OFDM symbol through baseband processing. Thus, it is possible to extract necessary information from the PLCP header data from time T1 in FIG. 4 and the PSDU user data from time T2.

As described above, in accordance with the wireless LAN receiver shown in FIG. 1 according to this embodiment of the invention, it is possible to detect the start of reception of the OFDM packet, perform automatic gain control (AGC), and complete subcarrier frequency synchronization and symbol timing synchronization during the ten short symbols t1 to t10 contained in the PLCP preamble of the OFDM packet in FIG. 4 according to the wireless LAN 802.11a standard. Then, the fine-tuning of subcarrier frequency synchronization and symbol timing synchronization is completed using the two long symbols T1 and T2 contained in the PLCP preamble. With the completion of the fine-tuning, it is possible to accurately extract necessary information from the PLCP header data from time T1 in FIG. 4 and the PSDU user data from time T2.

<<Configuration of Wireless LAN Receiver According to Another Embodiment>>

Figure 5:
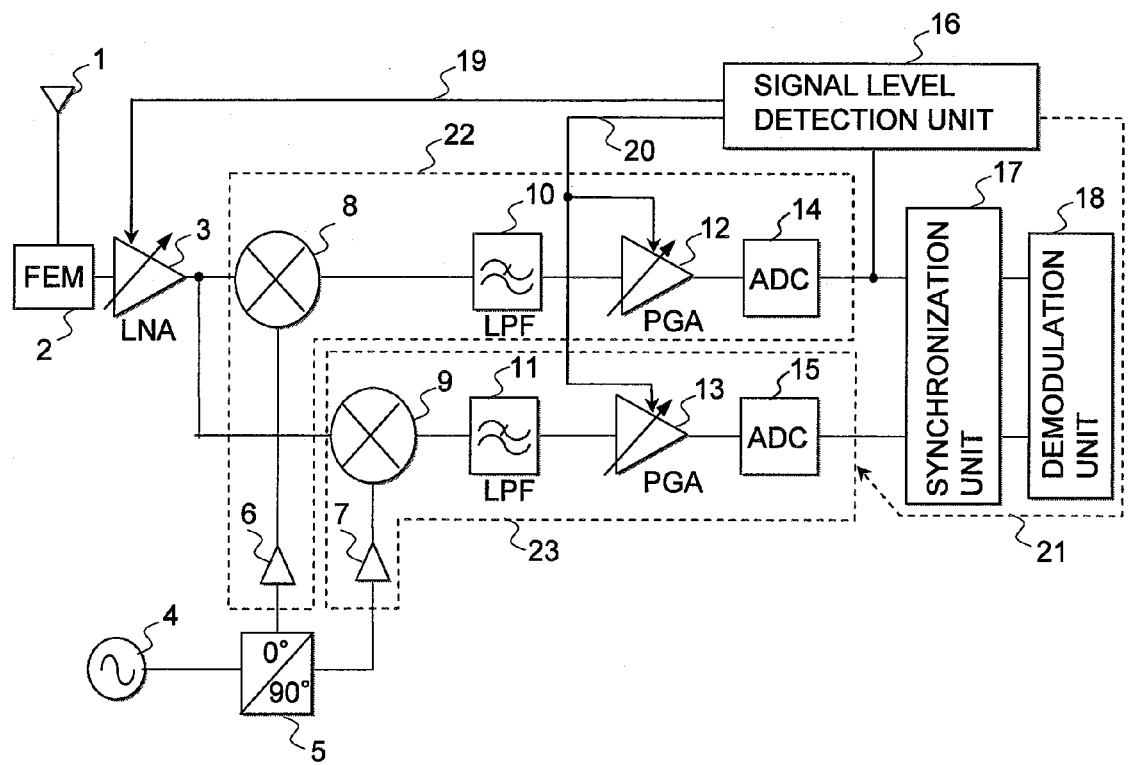
FIG. 5 is a diagram showing the configuration of a wireless LAN receiver according to a second embodiment of the invention.

FIG. 5 is a diagram showing the configuration of a wireless LAN receiver according to a second embodiment of the invention.

In the wireless LAN receiver shown in FIG. 1 according to the first embodiment of the invention, the I baseband digital signal as the output of the I signal A/D converter 14 and the Q baseband digital signal as the output of the Q signal A/D converter 15 are supplied to the signal level detection unit 16. On the other hand, in the wireless LAN receiver of FIG. 5 according to the second embodiment of the invention, only the I baseband digital signal from the output terminal of the I signal A/D converter 14 is supplied to the signal level detection unit 16.

In the case where the wireless LAN receiver of FIG. 5 receives the OFDM packet 30 containing the preamble and the data shown in FIG. 2 defined by the wireless LAN 802.11a standard, an RF signal inputted from the antenna 1 at time T0, an unwanted band thereof being eliminated through the front end module 2, is inputted to the low noise amplifier 3. An output of the local oscillator 4 is inputted to the 90-degree phase shifter 5, and the 90-degree phase shifter 5 outputs an I signal which is an in-phase component and a Q signal which is a quadrature component. The I signal outputted from the 90-degree phase shifter 5 is inputted to the I signal mixer 8 through the I signal local buffer 6. The I signal mixer 8 mixes the I signal inputted through the I signal local buffer 6 and the RF signal inputted from the low noise amplifier 3, thereby outputting an I baseband signal. The I baseband signal, a frequency component other than a desired frequency band thereof being suppressed through the I signal low-pass filter 10, is amplified by the I signal programmable gain amplifier 12, and the amplified signal is inputted to the I signal A/D converter 14.

The I baseband signal inputted to the I signal A/D converter 14 is A/D-converted, and the converted signal is inputted to the signal level detection unit 16 and the synchronization unit 17. The signal level detection unit 16 calculates the root-mean-square value of the I baseband signal to obtain an input signal level. If the input signal level is equal to or higher than a predetermined threshold value, the signal level detection unit 16 determines that a packet has arrived. The signal level detection unit 16 outputs the reception start signal 21 to the Q signal processing unit 23. The Q signal local buffer 7, the Q signal mixer 9, the Q signal low-pass filter 11, the Q signal programmable gain amplifier 13, and the Q signal A/D converter 15 are brought to the normal operation mode from the reception standby mode of low power consumption. In the Q signal processing unit 23 in the normal operation mode, the Q signal outputted from the 90-degree phase shifter 5 is inputted to the Q signal mixer 9 through the Q signal local buffer 7. The Q signal mixer 9 mixes the Q signal inputted through the Q signal local buffer 7 and the RF signal inputted from the low noise amplifier 3, thereby outputting a Q baseband signal. The Q baseband signal, a frequency component other than a desired frequency band thereof being suppressed through the Q signal low-pass filter 11, is amplified by the Q signal programmable gain amplifier 13, and the amplified signal is inputted to the Q signal A/D converter 15. The Q baseband signal inputted to the Q signal A/D converter 15 is A/D-converted, and the converted signal is inputted to the synchronization unit 17.

Since only the I baseband signal is inputted to the signal level detection unit 16, the signal level detection unit 16 adjusts the gain of the low noise amplifier 3 by means of the LNA gain adjustment signal 19, and adjusts the gain of the I signal programmable gain amplifier 12 and the gain of the Q signal programmable gain amplifier 13 by means of the PGA gain adjustment signal 20 so that the I baseband signal is inputted at an optimum level to the I signal A/D converter 14. The preamble of the packet signal 30 is a fixed pattern so that the root-mean-square value of the I baseband signal is equal to the root-mean-square value of the Q baseband signal, and the Q signal programmable gain amplifier 13 is adjusted to the same gain as the I signal programmable gain amplifier 12. Therefore, if the I baseband signal is inputted at the optimum level to the I signal A/D converter 14, the Q baseband signal is inputted also at the optimum level to the Q signal A/D converter 15.

After the completion of the gain adjustment, the synchronization unit 17 performs carrier frequency synchronization, symbol timing synchronization, and synchronous detection. Then, the demodulation unit 18 extracts, by demodulation, information from the data from time T1.

As shown in FIG. 4, according to the OFDM physical layer convergence procedure (PLCP) of the 802.11a wireless LAN system, the PLCP preamble from time T0 to time T1 contains 12 symbols including ten short symbols and two long symbols. In general, the first short symbol of the PLCP preamble is used for signal detection, the second to seventh short symbols are used for automatic gain control (AGC) and diversity selection, and the eighth to tenth short symbols are used for coarse frequency offset estimation and timing synchronization. Further, the two long symbols of the PLCP preamble are used for fine-tuning of frequency and channel estimation. If signal detection, automatic gain control (AGC), and diversity selection are not completed in the first to seventh short symbols of the PLCP preamble, the subsequent coarse frequency offset estimation and timing synchronization and the fine-tuning of frequency and channel estimation do not function properly so that the signal cannot be received.

In the first embodiment illustrated in FIG. 1, the time from when the signal level detection unit 16 detects the start of reception of the RF reception signal packet according to wireless LAN 802.11a to when the supply of the power supply voltage to the Q signal processing unit 23 is started and the signal is inputted to the Q signal A/D converter 15 is set to a symbol period of about 0.8 microseconds or less. However, in the case where the time from when the supply of the power supply voltage to the Q signal processing unit 23 is started to when the signal is inputted to the Q signal A/D converter 15 is as long as about 4 microseconds, signal detection, automatic gain control (AGC), and diversity selection may not be completed in the first to seventh short symbols of the PLCP preamble so that the signal cannot be received.

In the second embodiment illustrated in FIG. 5, since only the I baseband signal is inputted to the signal level detection unit 16 where only the I baseband signal is used to detect the reception signal level, it is enough for gain adjustment if only the I signal processing unit 22 operates. Since the Q signal processing unit 23 is activated in parallel with the gain adjustment of the I signal processing unit 22, it is enough if the rise time of the Q signal processing unit 23 falls within a gain control time. The gain control time is about 4.8 microseconds which is long enough to complete synchronization signal detection, automatic gain control (AGC), and diversity selection in the first to seventh short symbols of the PLCP preamble.

When the packet ends at time T3, the Q signal local buffer 7, the Q signal mixer 9, the Q signal low-pass filter 11, the Q signal programmable gain amplifier 13, and the Q signal A/D converter 15 configuring the Q signal processing unit 23 are brought, by the reception start signal 21, from the normal operation mode to the reception standby mode of low power consumption which is the same standby state as before time T0.

With the above configuration, even if the rise time of the Q signal processing unit 23 is slow, the Q signal local buffer 7, the Q signal mixer 9, the Q signal low-pass filter 11, the Q signal programmable gain amplifier 13, and the Q signal A/D converter 15 configuring the Q signal processing unit 23 are placed in the reception standby mode of low power consumption during reception standby, which can reduce the power consumption.

<<Wireless LAN according to a Specific Embodiment>>
<<RF Analog Semiconductor Integrated Circuit and Baseband Processing LSI used in Wireless LAN>>

FIG. 6 is a diagram showing the configuration of a wireless LAN system according to a specific embodiment of the invention.

The wireless LAN system of FIG. 6 contains an RF analog semiconductor integrated circuit 400 and a baseband processing unit LSI 500. The wireless LAN system of FIG. 6 can be commonly used in LAN terminals of a wireless LAN and an access point hub. The antenna 1 is coupled to an antenna switch 2A through which an RF reception input signal is supplied from the antenna 1 to a receiver system and an RF transmission output signal is supplied from a transmitter system to the antenna 1 by time division multiplexing access (TDMA).

<<RF Analog Semiconductor Integrated Circuit>>

A first direct down-conversion receiver system RF Rx/BB Rx_1 of the RF analog semiconductor integrated circuit 400 in FIG. 6 contains a low noise amplifier 3A, mixers 8A and 9A, programmable gain amplifiers 12B, 13B, 12D, and 13D, and low-pass filters 10B and 11B, in accordance with the 2.4-GHz frequency band of the IEEE802.11b/g standard. A second direct down-conversion receiver system RF Rx/BB Rx_2 of the RF analog semiconductor integrated circuit 400 contains a low noise amplifier 3B, mixers 8B and 9B, programmable gain amplifiers 12B, 13B, 12D, and 13D, and low-pass filters 10B and 11B, in accordance with the about 5-GHz (5.15 to 5.35 GHz) frequency band of the IEEE802.11a standard. Analog reception baseband signals I and Q generated by the first and second direct down-conversion receiver systems RF Rx/BB Rx_1 and Rx_2 are converted by A/D converters 14 and 15 into digital reception baseband signals Rx_I and Rx_Q, which are supplied to the baseband processing unit LSI 500.

The I baseband digital signal of the I signal A/D converter 14 of the RF analog semiconductor integrated circuit 400 in FIG. 6 and the Q baseband digital signal of the Q signal A/D converter 15 are supplied to a signal level detection unit 16 (not shown in FIG. 6) integrated in the RF analog semiconductor integrated circuit 400 of FIG. 6, and the signal level detection unit 16 outputs an LNA gain adjustment signal 19 and a PGA gain adjustment signal 20. The gains of the low noise amplifiers 3A and 3B of the first and second direct down-conversion receiver systems RF Rx/BB Rx_1 and Rx_2 are adjusted by the LNA gain adjustment signal 19 from the signal level detection unit 16. Further, the gains of the programmable gain amplifiers 12B, 13B, 12D, and 13D of the first and second direct down-conversion receiver systems RF Rx/BB Rx_1 and Rx_2 are adjusted by the PGA gain adjustment signal 20 from the signal level detection unit 16. Further, a reception start signal 21 from the signal level detection unit 16 is supplied to the Q signal processing unit of the second direct down-conversion receiver system RF Rx/BB Rx_2 according to the about 5-GHz frequency band of the IEEE802.11a standard.

In the wireless LAN system of FIG. 6 as well as in FIG. 1, if the signal level detection unit 16 determines that an RF reception signal packet according to wireless LAN system 802.11a has been received, the signal level detection unit 16 supplies the high level of the reception start signal 21 to the Q signal processing unit of the second direct down-conversion receiver system RF Rx/BB Rx_2. In response to the change of the reception start signal 21 from the low level to the high level, the supply of the power supply voltage to the Q signal local buffer 7, the Q signal mixer 9B, the Q signal low-pass filter 11B, the Q signal programmable gain amplifiers 13B and 13D, and the Q signal A/D converter 15 in the Q signal processing unit is started to start the operations of the circuits.

Then, in the wireless LAN system of FIG. 6, if the signal level detection unit 16 determines that the reception of the RF reception signal packet according to wireless LAN system 802.11a has been completed, the signal level detection unit 16 supplies the low level of the reception start signal 21 to the Q signal processing unit of the second direct down-conversion receiver system RF Rx/BB Rx_2. In response to the change of the reception start signal 21 from the high level to the low level, the supply of the power supply voltage to the Q signal local buffer 7, the Q signal mixer 9B, the Q signal low-pass filter 11B, the Q signal programmable gain amplifiers 13B and 13D, and the Q signal A/D converter 15 in the Q signal processing unit is stopped to stop the operations of the circuits. Therefore, it is possible to reduce the power consumption of the Q signal processing unit of the second direct down-conversion receiver system RF Rx/BB Rx_2 according to the about 5-GHz frequency band of the IEEE802.11a standard during reception standby.

Further, in the wireless LAN system of FIG. 6, the reception start signal 21 from the signal level detection unit 16 is supplied to the Q signal processing unit of the first direct down-conversion receiver system RF Rx/BB Rx_1 according to the about 2.4-GHz frequency band of the IEEE802.11b/g standard. According to the IEEE802.11b standard, a preamble and a header of a mandatory long format and a preamble and a header of an optional short format exist preceding PSDU user data. In the mandatory long format, a 144-bit PLCP preamble exists preceding a 48-bit PLCP header. In the optional short format, a 72-bit short PLCP preamble of 1 Mbits/sec exists preceding a 48-bit short PLCP header of 2 Mbits/sec.

In this case, if the signal level detection unit 16 determines from one of the above-mentioned two types of PLCP preambles that an RF reception signal packet according to wireless LAN system 802.11b has been received, the signal level detection unit 16 supplies the high level of the reception start signal 21 to the Q signal processing unit of the first direct down-conversion receiver system RF Rx/BB Rx_1. In response to the change of the reception start signal 21 from the low level to the high level, the supply of the power supply voltage or bias current to the Q signal local buffer 7, the Q signal mixer 9A, the Q signal low-pass filter 11B, the Q signal programmable gain amplifiers 13B and 13D, and the Q signal A/D converter 15 in the Q signal processing unit is started to start the operations of the circuits.

Then, in the wireless LAN system of FIG. 6, if the signal level detection unit 16 determines that the reception of the RF reception signal packet according to wireless LAN system 802.11b has been completed, the signal level detection unit 16 supplies the low level of the reception start signal 21 to the Q signal processing unit of the first direct down-conversion receiver system RF Rx/BB Rx_1. In response to the change of the reception start signal 21 from the high level to the low level, the supply of the power supply voltage to the Q signal local buffer 7, the Q signal mixer 9A, the Q signal low-pass filter 11B, the Q signal programmable gain amplifiers 13B and 13D, and the Q signal A/D converter 15 in the Q signal processing unit is stopped to stop the operations of the circuits. Therefore, it is possible to reduce the power consumption of the Q signal processing unit of the first direct down-conversion receiver system RF Rx/BB Rx_1 according to the about 2.4-GHz frequency band of the IEEE802.11b/g standard during reception standby.

Further, according to another embodiment of the invention, the A/D converters 14 and 15 can be formed in the chip of the baseband processing unit LSI 500 instead of the RF analog semiconductor integrated circuit 400. The RF analog semiconductor integrated circuit 400 includes an interface unit (INT) 25 coupled to a digital RF interface unit 50 of the baseband processing unit LSI 500 via three external lines. An enable signal EN, a clock signal CLK, and data Data (control command, control data) are supplied to the interface unit 25 from the digital RF interface unit 50.

Digital transmission baseband signals Tx_I and Tx_Q generated by the baseband processing unit LSI 500 are converted into analog transmission baseband signals by a D/A converter 31. Further, the D/A converter 31 can be formed in the chip of the baseband processing unit LSI 500 instead of the RF analog semiconductor integrated circuit 400. A first direct up-conversion transmitter system RF Tx/BB Tx_1 of the RF analog semiconductor integrated circuit 400 in FIG. 6 contains a low-pass filter 32, a transmission mixer 33A, and a driver amplifier 35A, in accordance with the 2.4-GHz frequency band of the IEEE802.11b/g standard. A second direct up-conversion transmitter system RF Tx/BB Tx_2 of the RF analog semiconductor integrated circuit 400 in FIG. 6 contains the low-pass filter 32, a transmission mixer 33B, and a driver amplifier 35B, in accordance with the about 5-GHz frequency band of the IEEE802.11a standard. On the outside of the RF analog semiconductor integrated circuit 400, an RF power amplifier 36A and a band-pass filter BPF4A are coupled to the output terminal of the driver amplifier 35A, and an RF power amplifier 36B and a band-pass filter BPF4B are coupled to the output terminal of the driver amplifier 35B. Further, on the outside of the RF analog semiconductor integrated circuit 400, a surface acoustic wave filter 2B is coupled to the input terminal of the low noise amplifier 3A, and a surface acoustic wave filter 2C is coupled to the input terminal of the low noise amplifier 3B.

A reception local signal supplied to the mixers 8A, 9A, 8B, and 9B of the RF analog semiconductor integrated circuit 400 and a transmission local signal supplied to the transmission mixers 33A and 33B are generated by a ΣΔ fractional PLL frequency synthesizer 26. A system reference frequency oscillator (TCXO) 39 is coupled to the ΣΔ fractional PLL frequency synthesizer 26. On the outside of the RF analog semiconductor integrated circuit 400, a crystal resonator 40 is coupled to the system reference frequency oscillator 39.

Further, the system reference frequency oscillator (TCXO) 39 may be formed outside the RF analog semiconductor integrated circuit 400 while a clock buffer is formed inside the RF analog semiconductor integrated circuit 400. The clock buffer inside the integrated circuit receives a system reference frequency clock signal generated by the system reference frequency oscillator (TCXO) 39 outside the integrated circuit, and supplies the clock signal to the ΣΔ fractional PLL frequency synthesizer 26 inside the integrated circuit.

<<Baseband Processing LSI>>

The baseband processing unit LSI 500 is coupled to the RF analog semiconductor integrated circuit 400. The baseband processing unit LSI 500 contains the digital RF interface unit 50, a transmission/reception baseband processing unit 51, a DMA transfer unit 56, a host interface unit (HIU) 57, a bus BUS, a CPU 58, and a RAM 59. The transmission/reception baseband processing unit 51 contains a demodulator (Demod) 52, a fast Fourier transformer (FFT)/inverse fast Fourier transformer (IFFT) 53, a modulator (Mod) 54, and a Viterbi decoder 55. The digital reception baseband signals Rx_I and Rx_Q from the RF analog semiconductor integrated circuit 400 are supplied to the demodulator (Demod) 52, and the digital transmission baseband signals Tx_I and Tx_Q to the RF analog semiconductor integrated circuit 400 are generated by the modulator (Mod) 54. The host interface unit 57 is coupled to a host 600 such as a personal computer (PC) via a PCI bus. The host 600 contains a CPU 61, a memory controller/PCI bus bridge 62, and a RAM 63. Transmission/reception data between the host interface unit 57 and the transmission/reception baseband processing unit 51 are transferred by the DMA transfer unit 56. PCI stands for Peripheral Component Interconnet, and DMA stands for Direct Memory Access. An external flash nonvolatile memory 700 is coupled to the bus of the baseband processing unit LSI 500. The external flash nonvolatile memory 700 can store control programs for the RF analog semiconductor integrated circuit 400 and the baseband processing unit LSI 500. The RF analog semiconductor integrated circuit 400 is controlled via the three external lines between the digital RF interface unit 50 and the interface unit (INT) 25 from the baseband processing unit LSI 500.

<<Fast Fourier Transform/Inverse Fast Fourier Transform for OFDM Transmission/Reception>>

Data reception signal processing based on wireless LAN OFDM is mainly controlled by the direct down-conversion receiver and the A/D converters 14 and 15 in the RF analog semiconductor integrated circuit 400 and the demodulator 52, the fast Fourier transformer 53, and the Viterbi decoder 55 in the baseband processing unit LSI 500. Data transmission signal processing based on wireless LAN OFDM is mainly controlled by the modulator 54 and the inverse fast Fourier transformer 53 in the baseband processing unit LSI 500 and the D/A converter 31 and the direct up-conversion transmitter in the RF analog semiconductor integrated circuit 400.

While the invention made above by the present inventors has been described specifically based on the illustrated embodiments, the present invention is not limited thereto. It is needless to say that various changes and modifications can be made thereto without departing from the spirit and scope of the invention.

For example, in the above-described embodiments of the invention, the signal level detection unit monitors the signal strength of a preamble in the I signal processing unit during reception standby and determines the reception start and reception end of the RF reception signal packet, thereby controlling the start and end of the supply of the power supply voltage to the Q signal processing unit. However, the invention is not limited thereto, and the signal level detection unit can also monitor the signal strength of a preamble in the Q signal processing unit during reception standby and determine the reception start and reception end of the RF reception signal packet, thereby controlling the start and end of the supply of the power supply voltage to the I signal processing unit.

While the reception of the packet data of the wireless LAN has been described as a specific example in the above embodiments of the invention, the invention is not limited thereto. That is, the invention is applicable to a receiver that performs packet communications using orthogonal signals. In order to enable a packet to be received at any time, the first signal processing unit (22) containing the first mixer, the first programmable gain amplifier, and the first A/D converter is controlled to the active state before the antenna receives the RF reception signal. On the other hand, the second signal processing unit (23) containing the second mixer, the second programmable gain amplifier, and the second A/D converter is controlled to the low power consumption state, which can reduce the power consumption during reception standby.

Further, as a method for reducing the power consumption of one of the I signal processing unit and the Q signal processing unit during reception standby, it is possible to adopt a method for setting a power supply voltage level supplied during reception standby to about half that in the normal operation mode, besides stopping the supply of the power supply voltage. This method can enhance the speed of the transition from the reception standby mode to the normal operation mode.

Further, as another method for reducing the power consumption of one of the I signal processing unit and the Q signal processing unit during reception standby, a switch coupled between a ground line and the internal circuits of one of the I signal processing unit and the Q signal processing unit is opened during reception standby, thus making it possible to reduce the power consumption during reception standby. This method also can enhance the speed of the transition from the reception standby mode to the normal operation mode.

Further, for example, instead of the I and Q baseband digital output signals from the I signal A/D converter 14 and the Q signal A/D converter 15, the I and Q baseband analog input signals of the I signal A/D converter 14 and the Q signal A/D converter 15 also can be supplied to the signal level detection unit 16. Furthermore, the signals outputted from the I and Q signal mixers can be supplied to the signal level detection unit 16 to output the reception start signal 21. Moreover, the signals to be inputted to the I and Q signal mixers can be supplied to the signal level detection unit 16 to output the reception start signal 21.

Thus, the signal level detection unit 16 detects the arrival of the packet, thereby outputting the reception start signal 21. With the configuration in which the reception start signal 21 changes one of the I signal processing unit and the Q signal processing unit from the reception standby mode of low power consumption to the normal operation mode, it becomes possible to reduce the power consumption during reception standby.

The packet data 30 received by the receiver according to the invention is not limited to transfer data transferred by the wireless LAN. For example, the invention is applicable to the WiMedia standard of a wireless PAN using Ultra Wide Band (UWB) communication for achieving wireless data transfer at a maximum rate of 480 Mbps at a maximum distance of 10 m. UWB stands for Ultra Wide Band, and PAN stands for Personal Area Network.

Further, in the wireless LAN system of FIG. 6, the RF analog semiconductor integrated circuit 400 and the baseband processing unit LSI 500 can also be integrated in a single LSI chip.

What is claimed is:

1. A receiver comprising:
a first signal processing unit which generates a first conversion signal by detecting an in-phase or quadrature signal from a quadrature modulation signal inputted to the first signal processing unit;
a second signal processing unit which generates a second conversion signal by detecting a signal having a phase difference of about 90 degrees with respect to the first conversion signal from the quadrature modulation signal inputted to the second signal processing unit; and
a signal level detection unit which generates a reception start signal by receiving the first conversion signal,
wherein, before the quadrature modulation signal is inputted, the first signal processing unit is controlled to an active state, and the second signal processing unit is controlled to a low power consumption state, and
wherein, after the quadrature modulation signal is inputted, the second signal processing unit is controlled to an active state from the low power consumption state in response to the reception start signal generated by the signal level detection unit to receive a succeeding data signal with both the first and second signal processing units in the active state until an end of the received succeeding data signal regardless of a state of the first and second conversion signals.

2. The receiver according to claim 1,
wherein the quadrature modulation signal is packet data including payload data, a preamble and a header preceding the payload data, and
wherein the signal level detection unit detects the signal of the preamble, thereby generating the reception start signal.

3. The receiver according to claim 2, wherein the packet data is transfer data by a wireless LAN.

4. The receiver according to claim 3, wherein the wireless LAN is based on an IEEE802.11a standard and any one of IEEE802.11b, 11g, and 11n standards.

5. The receiver according to claim 1, wherein the reception start signal is a logic signal, and the active state and the low power consumption state of the second signal processing unit are controlled by a level of the logic signal of the reception start signal.

6. The receiver according to claim 1, wherein the first signal processing unit is controlled to the active state by supplying a power supply voltage to the first signal processing unit, the second signal processing unit is controlled to the low power consumption state by cutting off the supply of a power supply voltage to the second signal processing unit, and the second signal processing unit is controlled to the active state from the low power consumption state by supplying the power supply voltage to the second signal processing unit in response to the reception start signal.

7. The receiver according to claim 1,
wherein the first signal processing unit includes a first mixer, a first channel filter, and a first programmable gain amplifier, and
wherein the second signal processing unit includes a second mixer, a second channel filter, and a second programmable gain amplifier.

8. The receiver according to claim 1,
wherein the first signal processing unit includes a first mixer, a first channel filter, a first programmable gain amplifier, and a first A/D converter, and
wherein the second signal processing unit includes a second mixer, a second channel filter, a second programmable gain amplifier, and a second A/D converter.

9. The receiver according to claim 8, wherein the signal level detection unit measures a level of the first conversion signal supplied from the first A/D converter of the first signal processing unit, and controls gain of the first programmable gain amplifier and the second programmable gain amplifier, based on a result of a measurement of the level of the first conversion signal by the signal level detection unit.

10. A receiver comprising:
a first A/D converter which A/D-converts a first analog signal inputted from a first signal processing unit which generates a first conversion signal by detecting an in-phase or quadrature signal from a quadrature modulation signal inputted to the first signal processing unit;
a second A/D converter which A/D-converts a second analog signal inputted from a second signal processing unit which generates a second conversion signal by detecting a signal having a phase difference of about 90 degrees with respect to the first conversion signal from the quadrature modulation signal inputted to the second signal processing unit; and
a signal level detection unit which generates a reception start signal by receiving the first conversion signal,
wherein, before the first analog signal is inputted, the first A/D converter is controlled to an active state, and the second A/D converter is controlled to a low power consumption state, and wherein, after the first analog signal is inputted, the second A/D converter is controlled to an active state from the low power consumption state in response to the reception start signal generated by the signal level detection unit to receive a succeeding data signal with both the first and second signal processing units in the active state until an end of the received succeeding data signal regardless of a state of the first and second conversion signals.

11. The receiver according to claim 10, wherein the quadrature modulation signal is packet data including payload data, a preamble and a header preceding the payload data, and wherein the signal level detection unit detects the signal of the preamble, thereby generating the reception start signal.

12. The receiver according to claim 11, wherein the packet data is transfer data by a wireless LAN.

13. The receiver according to claim 12, wherein the wireless LAN is based on an IEEE802.11a standard and any one of IEEE802.11b, 11g, and 11n standards.

14. The receiver according to claim 10, wherein the reception start signal is a logic signal, and the active state and the low power consumption state of the second A/D converter are controlled by the level of the logic signal of the reception start signal.

* * * * *